May 23, 1933.  H. E. BURNS  1,910,086
PRODUCTION OF SCREW THREADED NUTS AND THE LIKE
Filed March 8, 1930  3 Sheets-Sheet 3
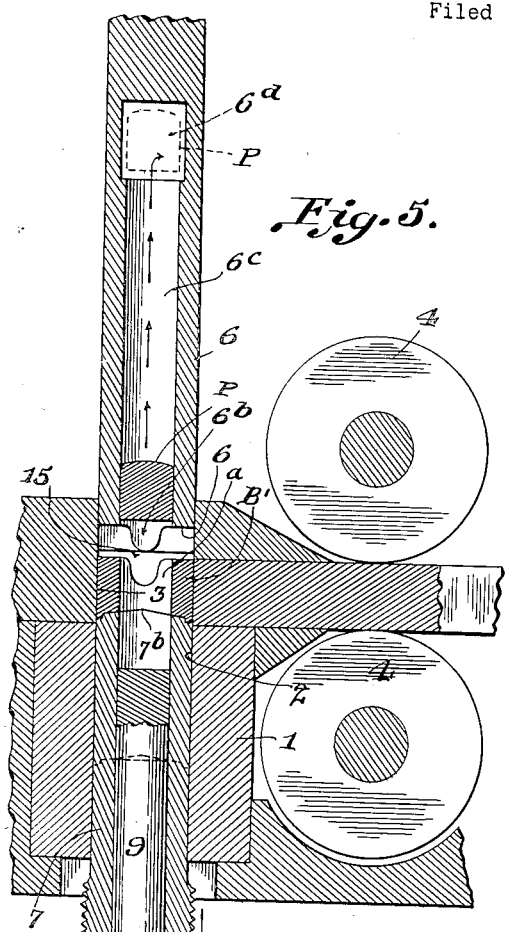
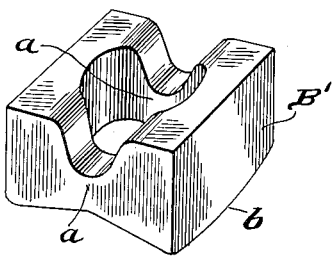
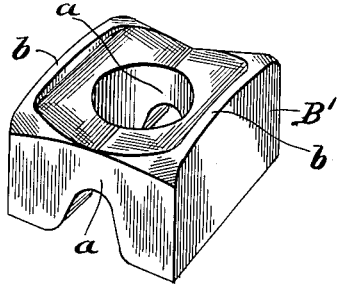
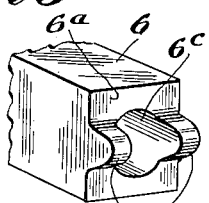
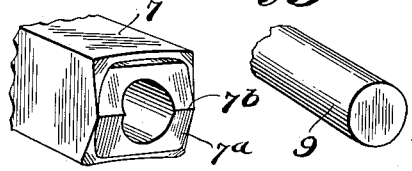
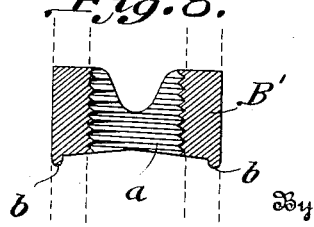

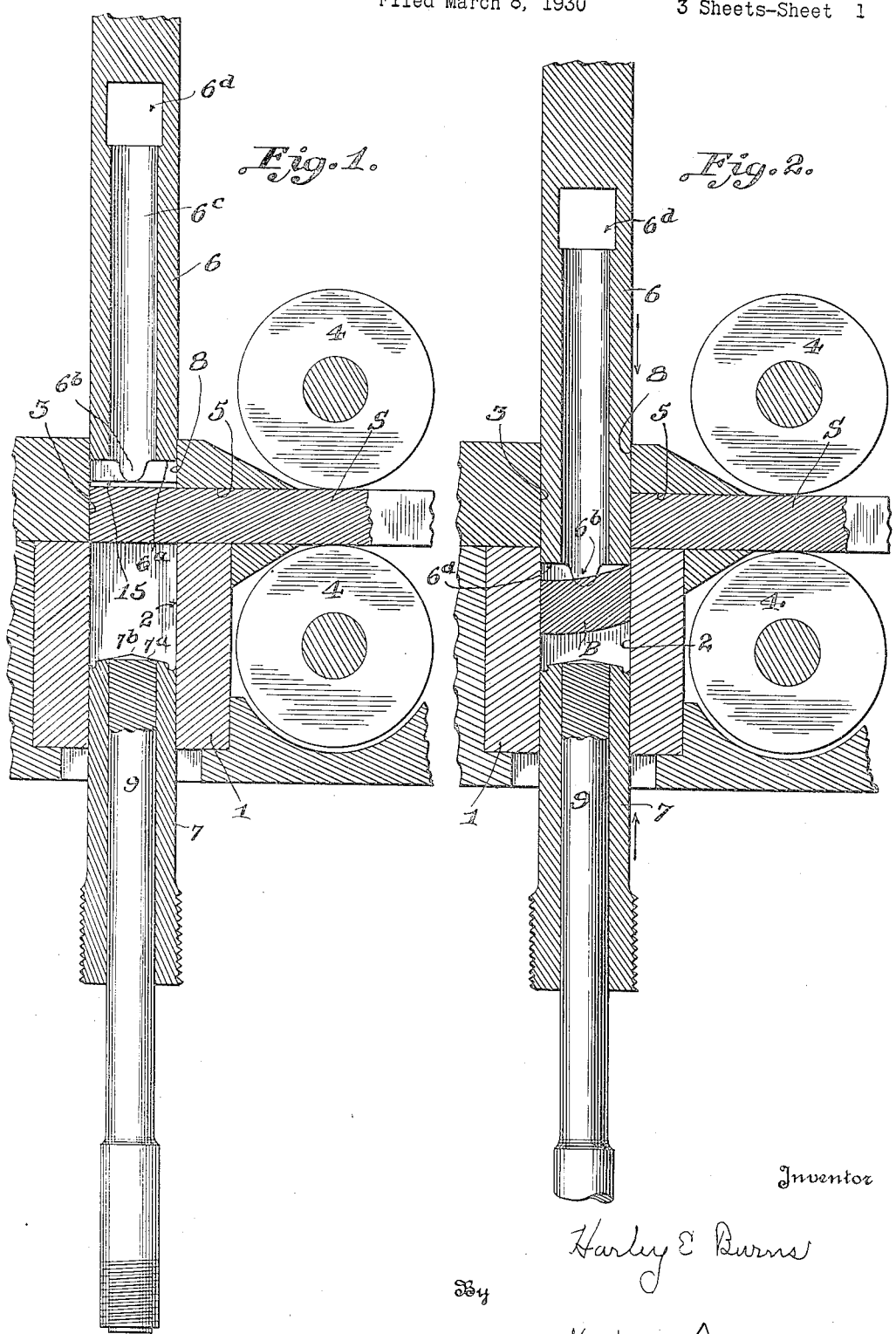

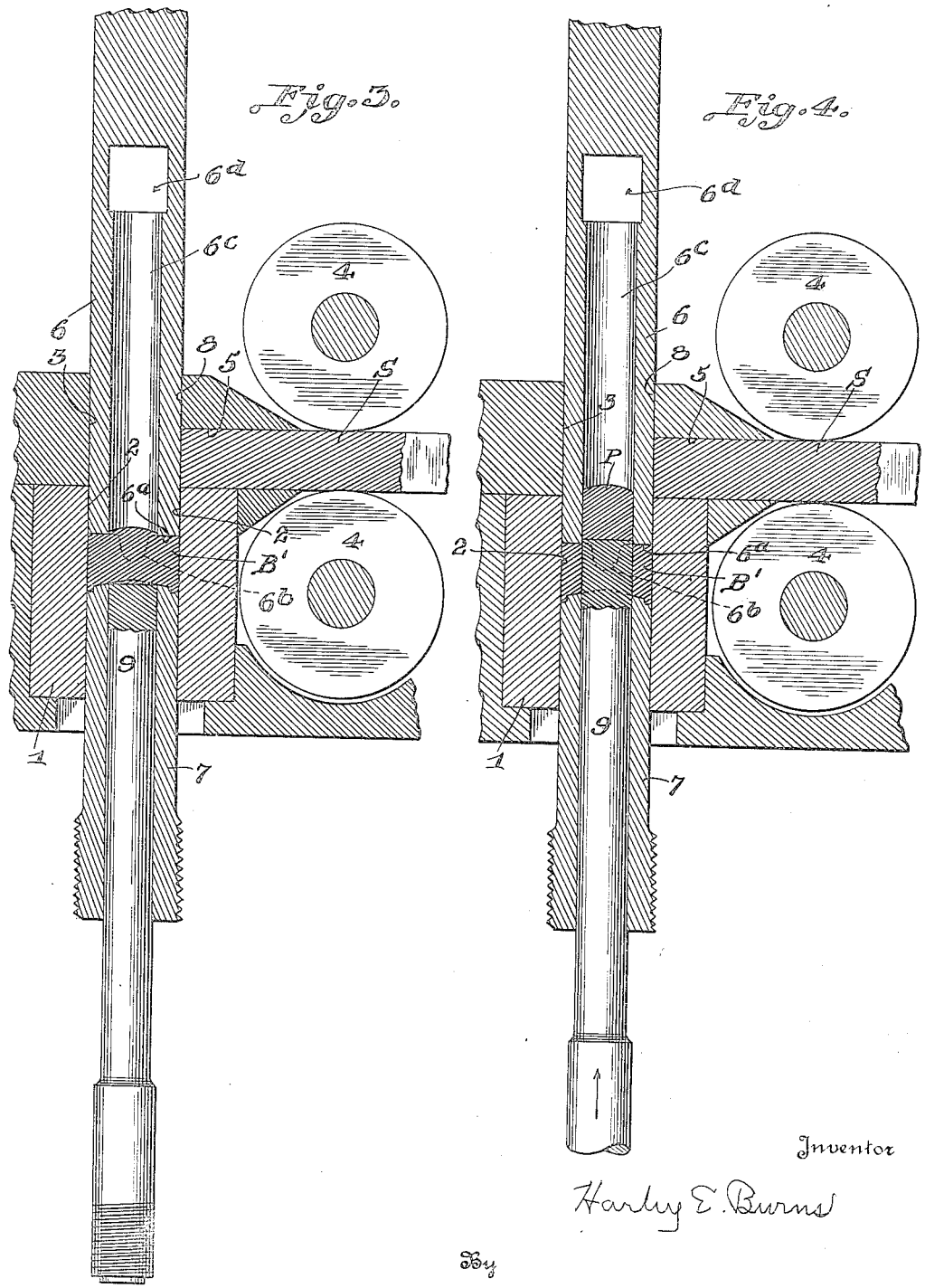

Patented May 23, 1933

1,910,086

UNITED STATES PATENT OFFICE

HARLEY E. BURNS, OF CHICAGO, ILLINOIS

PRODUCTION OF SCREW THREADED NUTS AND THE LIKE

Application filed March 8, 1930. Serial No. 434,271.

This invention relates to apparatus capable of operating on a method under which a metal slug at red heat, or proper forging temperature, while confined within a shaping die or matrix internally of the exterior dimensions and peripheral form of the finished nut to be produced, and by which said slug is forged, hammered or compressed between and by simultaneously-applied high pressure shaping and condensing opposing forces, such as forging tools, to condense the approximately-oversize slug to the end formations and longitudinal dimensions of said finished nut, for instance, the nut disclosed by my Patent No. 1774081, dated August 26, 1930, and to drive into the nut blank surplus metal and metal displaced during the forging operation, and to produce a nut having condensed ductile portions rendering the nut capable of bending and permanently remaining in the form to which bent, and to finally produce a lock nut of the desired weight with a bolt hole of uniform diameter and screw threaded throughout its length to spin freely on its appropriate bolt up to loose contact with the hard abutment against which it is to be forced to its final seat.

An object of the invention is to provide improved apparatus for the economical rapid production of hot forged nuts for screw threaded bolts, rods and the like, and from a specific standpoint, whereby such nuts will be of the desired weight and strength and capable of spinning freely on their appropriate bolts and will possess ductile characteristics rendering the nuts bendable and capable of permanently remaining in the form to which bent, for locking purposes.

With the foregoing and other objects in view my invention consists in certain novel features in structure, arrangement, or combination as hereinafter more fully and particularly explained and specified.

Referring to the accompanying drawings, forming a part hereof:

Fig. 1 is a horizontal section showing my forging machine, in part, with the cooperating plunger dies or hammers and the punch or piercer in withdrawn positions, and the length of metal stock at red heat or other forging temperature across one end of the matrix or hollow die.

Fig. 2 is a similar view except that the plunger die that constitutes the combined cut-off and crowner is shown in the act of driving a red hot metal blank or slug in the matrix that it has severed from the stock, toward the cooperating forging plunger or hammer which is shown just starting on its hammering or forging stroke toward said advancing blank and combined cut-off and crowner.

Fig. 3 is a similar view except that the two opposing hammers or dies are shown at their hammering or forging stroke limits with the intervening hot metal slug forged and condensed to the exterior forms and dimensions of the nut to be finally finished therefrom, excepting the removal of the material to form the bolt hole.

Fig. 4 shows the two hammers or dies and the forged blank in the same positions as in Fig. 3, but shows the piercer or puncher at its operative stroke limit with the slug removed to form the bolt hole.

Fig. 5 is a similar view except that the combined cut-off and crowner is shown in normal withdrawn position to which it has retired from its position of Fig. 4, and the opposing hammer is shown at its advancing stroke limit with the completed forged blank discharged from the matrix and ready to drop therefrom.

Figs. 6 and 7 are perspective views of one form of blank that can be produced by my method and apparatus.

Fig. 8 shows a finished self-locking nut that can be produced from said blank by tapping or screw threading the bolt hole.

Fig. 9 is a perspective of the shaping end of a form of combined cut-off and crowner that can be employed in my apparatus.

Fig. 10 is a perspective of the shaping end of a cooperating hammer or plunger that can be employed, and Fig. 11 is a perspective of the operative end of a piercer that can be employed.

An annular die or matrix 1, is normally held in the apparatus rigidly in fixed position and against expanding under heavy internal expansive forces. The longitudinal shaping bore 2, of this matrix is of substantial length and of uniform internal cross sectional dimensions throughout its operative length to produce a nut blank of the exterior circumferential or peripheral form and dimensions of the nut to be finished and produced from said blank. If a square, rectangular, hexagonal, or other circumferentially shaped nut is to be produced of a certain size or exterior circumferential dimensions, the bore or interior of the matrix is of corresponding internal annular or cross sectional shape and dimensions.

One end of this matrix or annular die is open to longitudinally receive the red hot block or slug of metal to be forged within the matrix into lock nut form, and for discharge of the forged lock nut blank from the matrix. I prefer to cut the slug or block of metal from the end of an elongated stock S, of red hot metal, such as steel of the desired analysis, arranged across the end of the die block and covering the receiving and outlet end of the die or matrix, with the end face of the length of stock abutting a fixed gauge or stop wall 3. The stock S, can be fed forward by man power, or if so desired power driven feed rolls 4, can be provided to advance the stock step by step, as required. In the example shown, the stock slides forward through a suitable guideway 5, supported by the frame of the machine, and the stock is arranged between and positively engaged by the opposing feed rolls 4, although other means can be provided for supporting and feeding the bar of stock S, at forging temperature.

A pair of longitudinally alined cooperating opposing forging tools or plungers are longitudinally alined with the longitudinal bore of the die or matrix, and the cross sectional dimensions and form of these plungers conform to the cross sectional form and dimensions of said matrix bore 2, whereby the plungers are longitudinally and snugly slidable in said bore.

These plungers constitute the combined cut-off and crowner 6, and the opposing co-operating shaping and compressing hammer 7. The combined cut-off and crowner 6, is guided by and slidable through guide 8, fixedly carried by the supporting structure of the machine, and transversely intercepted by the path in which the stock S, travels as defined by guideway 5, and hence said guide 8, is arranged opposite and spaced from the inlet end of the matrix bore 2, so that the combined cut-off and crowner travels to and from its withdrawn position, see Figs. 1 and 5, wherein it is clear of the matrix bore and path of stock S, and its limit of operative stroke when it extends across the path of the stock and a substantial distance into the matrix bore, see Figs. 3 and 4.

The hammer 7, enters the opposite end of the matrix bore from that entered by plunger 6, and is guided by and remains in said bore during its operating and return strokes, and is shown in its withdrawn position in Fig. 1, and at its forging stroke limit in Figs. 3 and 4. The working end of plunger 6, determines the shape or form of the crown or outer end of the finally finished nut. The transverse or working end 6a, of the plunger 6, is formed to cooperate with the opposing end of the die or matrix block 1, at the receiving end of the bore 2, to constitute a cut-off for detaching from the hot stock bar S, a block or slug B, and forcing said block B, into the matrix bore. The working end of said plunger 6, is also formed with a hot metal condensing rib 6b, arranged transversely across the same or radially of the longitudinal axis of the plunger approximately centrally of the width of said working face.

The opposing working face of the plunger 7, is shaped to determine the form of the rear or back end of the finally finished nut, and in the particular example shown, said working face is formed with an approximately central tapered transverse ridge 7a, providing a transverse elevated line or apex 7b, opposite and parallel with the rib 6b, of plunger 6.

The plungers 6 and 7, are formed with central longitudinal bores opening through their working faces, to slidably receive and for the longitudinal operation of the bolt hole punch or piercer 9, normally arranged in and reciprocating with plunger 7, and having its working end located in the plane of the plunger working face and closing the bore in said plunger. The diameter of the cylindrical punch 9, determines the diameter of the bolt hole in the finished nut produced by my method, and the diameter of the nut bolt hole is determined by the exterior size of the nut according to standards determined by manufacturing or trade customs or by other regulations.

The punch 9, moves with the hammer 7, approximately as a fixed part thereof during the forging operations but at the completion of the forging operation and while the plungers 6 and 7, are at rest at their limits of operative strokes with the forged blank B', between their working faces (Fig. 3) the punch 9, advances in hammer or plunger 7, and pierces the hot blank B', punching a plug P, of metal therefrom to form the bolt hole, and this plug P, is pushed longitudinally into the bore 6c, of the plunger 6, see Fig. 4. Each plug P, pushed into the plunger bore 6c, advances the plugs previously deposited in said bore toward the discharge opening 6d, through which the plugs successively drop. After each piercing stroke, the punch withdraws to its normal withdrawn position, while the plunger or hammer 7, advances on its nut blank discharging movement.

The stock S, to be operated on by the apparatus, is preferably slightly thicker than the longitudinal thickness of the completed forged nut, although the width of the stock may approximate the transverse or cross sectional dimensions of the matrix bore to readily enter the same, all to provide a slight hot metal surplus to be driven into the blank by the forging operation. The stock is rectangular in cross section with flat sides and edges. With the working parts of the apparatus in the withdrawn positions and the hot stock S, extending at a forging temperature, and across the matrix and abutting stop 3, all as shown by Fig. 1, the plunger 6, (the combined cut-off and crowner) performs its operative stroke at high speed and under heavy driving power, and cuts off hot block B, and drives the same into the matrix, see Fig. 2, and in the meantime plunger 7 (the cooperating hammer) starts on its opposing operative stroke at high speed and under heavy driving power to meet the hot block B, advancing in the opposite direction and backed by the high speed plunger 6, at the forging location a substantial distance within the matrix bore, see Fig. 3. These high speed oppositely moving plungers hence subject the interposed hot block to a powerful heavy hammering blow and very high condensing forging pressure, under which the hot metal block is longitudinally condensed to the exterior end forms and thickness dimensions of the finished nut blank, Figs. 6 and 7, and of the finished nut Fig. 8, and is expanded against the surrounding shaping wall of the matrix to the exterior peripheral or circumferential form and dimensions of the completed articles of Figs. 6, 7 and 8.

The hot metal block is hence by this forging hammer action, simultaneously reduced to the final exterior forms and dimensions of the finally finished nut, and rendered exceedingly tough and strong, flexible for bending or deforming to locking position on its bolt, and capable of permanently remaining in the position to which bent or deformed. This result is attained by the heavy hammering pressure which drives the surplus and displaced hot metal into the blank in shaping the block, while circumferentially confined, to produce the relatively flexible or hinge portions a, of the completed article, Figs. 6, 7, and 8, wherein the hot metal is condensed and rendered more dense, by the cooperating action of the raised portions 7b, and 6b, of the opposed plunger working faces. The result is a nut of strength against splitting and holding power against thread stripping as well as weight of metal, preferably equal to the strength, holding power and weight of an ordinary nut of the same rated size and bolt hole and not having the grooved and recessed ends, and not possessing the self locking characteristic of the nut of Figs. 6, 7, and 8.

While the still hot forged blank B', is held between the now stationary plungers 6, 7, see Fig. 3, the operating mechanism advances the punch 9, in the plunger 7, and punches the bolt hole through blank B', pushing the plug P, thus removed from the blank into the discharge bore 6c, of plunger 6, as shown by Fig. 4. The operating mechanism thereupon moves the punch 9 and the plunger 6, on their return strokes, and after the plunger 6, has withdrawn from and left the forged blank B', the operating mechanism starts the hammer or plunger 7, on its blank discharging stroke toward the discharge or open end of the matrix bore and pushes the blank from the open end of the matrix bore, see Fig. 5, wherein the blank is shown ready to drop from the matrix through the bottom discharge opening 15, partially showing in Figs. 1 and 5.

The operating mechanism then returns plunger 7, to its withdrawn position, Fig. 1, the plunger 6, having been returned to its withdrawn position, and while these plungers are in withdrawn positions, the bar of hot stock S, is advanced a step, by rolls 4, or other means, across the matrix and against stop 3, in position for another cutting off and forging operation.

Where the matrix bore and plungers 6, and 7, are of the forms here shown, the forged nut blank of Figs. 6, and 7, will be produced, although I do not wish to limit my invention to the production of blanks of substantially this form as the design can be varied without departing from the invention. Also, I do not wish to limit all features of my invention to the step of punching the bolt hole while the hot forged blank is confined in the matrix between the plungers, as the bolt hole can be formed after the blank has been discharged from the matrix. However, I prefer to punch the bolt hole as hereinbefore described while the blank is held in the matrix.

After the nut blank of Figs. 6, and 7, has been discharged from the matrix, it is screw threaded, and usually polished or finished by tumbling or otherwise, to produce the finished self locking nut of Fig. 8. This finished self locking nut has a bolt hole of uniform diameter throughout its length and is uniformly screw threaded throughout the length of its bolt hole, to spin freely on its appropriate screw threaded bolt, for quick and easy rotation thereon up to loose contact with a hard or metal abutment, and to thereupon flex or bend at portions a, and cause the crown portions of the nut to tightly grip the bolt without distorting the screw threads, when the necessary nut rotating force is applied and continued to force the bearing portions b, at the back of the nut, to their final tight seat against the opposing abutment.

It will be noted that the blank B', is forged in the matrix to the final exterior peripheral and end shapes and dimensions of the finished nut with its exterior wrench receiving flats or faces parallel with the bolt hole or longitudinal axis of the nut.

By locating the deep groove-forming rib 6b, on the end face of the combined cut off and crowner (plunger 6) which is withdrawn from the forged blank B', before said blank is started on its discharging movement from the forging station or location in the matrix, I avoid difficulties resulting from tendency of the forged blank to stick to the plunger end face formed with rib 6b.

Where arranged as shown by the drawings, the crown of the nut is formed by the cut off plunger, and this plunger withdraws and separates readily from the forged blank while said blank remains in the location in which forged. After the cut off plunger has withdrawn, the hammer plunger 7, readily, forces the forged blank B', from forged position and from the open end of the matrix, and the blank thereupon does not adhere to and drops freely from the low ridged or approximately flat end face 7a, 7b.

I have not illustrated power actuated cam or other driving and timing mechanisms for operating the moving parts in sequence and in cooperation as hereinbefore described, because mechanisms well known in forging and other machinery parts can be employed and adapted by the engineer or designer to operate the moving parts shown by the drawings as hereinbefore described.

Having now particularly described and ascertained the nature of my said invention and in what manner the same is to be performed, I declare that what I claim is:—

1. Apparatus for forging blanks in the production of locking nuts having a bendable portion; including a matrix for determining the circumferential form and dimensions of the nut; alined plungers longitudinally alined with the matrix, one of said plungers forming a combined cut-off and crowner and at its working face having a transverse elevated rib, the opposing plunger forming a cooperating hammer and at its working face having a transverse elevated portion to cooperate with the rib of the combined cut-off and crowner in forging the reduced portion in the nut blank and driving the displaced metal into the blank; and a piercer for punching the bolt hole in the forged blank while held within the matrix and between said plungers.

2. In nut forging apparatus, a matrix having a bore of uniform cross sectional dimensions throughout its operative length and at one end open to receive a hot metal block and for discharge of the forged blank; a reciprocatory forging plunger alined with said matrix bore and constituting a combined cut-off and crowner for reciprocating through said end into the bore for carrying a block of hot metal thereinto and for returning from the bore through said end to permit discharge of the forged block; and another plunger alined with said bore and arranged in the matrix and forming a hammer cooperating with said combined cut-off and crowner to act in opposition thereto in subjecting the hot blank in the matrix to high speed high compression hammering in forging the hot block to the final exterior shapes and dimensions of the finished nut and in displacing and condensing the metal of the block to forge a bendable reduced portion therein.

3. Apparatus for forging blanks for nuts including a matrix having a nut shaping bore open at one end and of substantial length and of uniform cross sectional dimensions throughout the length of its blank receiving portion, the cross sectional shape and dimensions of said bore receiving portion being of the shape and dimensions of the completed nut; a hammering and blank back shaping and blank ejecting tool reciprocatory in said bore; and a crowner reciprocatory in said bore to cooperate with said tool in forging, condensing and shaping a blank in said bore; said crowner at its working face having a transverse deep-groove-forging portion; said crowner having a path of movement into and from the bore through the open end thereof, to withdraw and separate from the deeply grooved crown of the forged blank at forging position in said bore and from the open end of the bore preparatory to the blank ejecting advancing movement of said tool.

4. Apparatus for the production of a nut having a longitudinally reduced portion on which the nut is bendable to permanent bolt gripping form, including a matrix of the cross sectional form and dimensions of the perimeter of the finished nut blank, said matrix having an open end for reception of the metal slug at forging temperature and for discharge of the forged blank of the exterior shape and dimensions of the final nut; a reciprocatory high pressure crowner operating through and adapted to withdraw from said open end of the matrix; and an opposing cooperating high pressure reciprocatory hammer operating in said matrix through and closing the opposite end thereof, the working face of said crowner formed to forge a deep depression across the crown end of said slug.

5. Apparatus for making a forged nut blank of the end and perimeter shapes and exterior dimension of the finally finished screw threaded nut including an annular restraining and nut blank perimeter shaping die; opposing high pressure hammering and forging means adapted to operate longitudinally within said die on a metal slug at forging temperature within said die and between said means to longitudinally condense and laterally expand said slug within said die to shape the perimeter thereof to the perimeter form and dimensions of the completed nut and to reduce the slug ends to the end shapes of the completed nut, said means being formed to reduce the length of said slug at a transverse portion thereof and drive the displaced metal into the body of the slug to form the finished nut with a transverse bendable portion; one of said means being operable to expel the forged blank from said die, and another of said means constituting a transversely-grooving nut blank crowner formed to deeply enter the crown of the blank and to withdraw therefrom.

Signed at Chicago, county of Cook, State of Illinois, this 28th day of February, 1930.

HARLEY E. BURNS.